(12) United States Patent
Raue

(10) Patent No.: US 7,841,435 B2
(45) Date of Patent: Nov. 30, 2010

(54) TRANSMISSION

(75) Inventor: Josef Raue, Dülmen (DE)

(73) Assignee: Kordel Antriebstechnik GmbH, Dulmen (DE)

( * ) Notice: Subject to any disclaimer, the term of this patent is extended or adjusted under 35 U.S.C. 154(b) by 242 days.

(21) Appl. No.: 11/838,433

(22) Filed: Aug. 14, 2007

(65) Prior Publication Data

US 2008/0041654 A1 Feb. 21, 2008

(30) Foreign Application Priority Data

Aug. 15, 2006 (DE) .................. 10 2006 038 396

(51) Int. Cl.
*B60K 1/00* (2006.01)
(52) U.S. Cl. .................... 180/65.5; 180/65.6
(58) Field of Classification Search .......... 180/65.1, 180/65.51, 60, 337, 342, 343, 374, 385, 11, 180/245, 246, 65.6
See application file for complete search history.

(56) References Cited

U.S. PATENT DOCUMENTS

| | | | |
|---|---|---|---|
| 1,743,751 A * | 1/1930 | Baker | 310/83 |
| 2,774,434 A * | 12/1956 | Ferris | 180/6.3 |
| 2,818,669 A | 1/1958 | Perry et al. | |
| 3,392,797 A * | 7/1968 | Gibson et al. | 180/253 |
| 3,522,861 A * | 8/1970 | Knapp et al. | 180/243 |
| 3,804,190 A * | 4/1974 | Shaffer | 180/253 |
| 3,827,528 A | 8/1974 | Shaffer | |
| 5,558,174 A | 9/1996 | Avitan | |
| 6,688,416 B2 * | 2/2004 | Higaki et al. | 180/253 |
| 6,722,459 B1 * | 4/2004 | Wendl et al. | 180/65.51 |
| 6,866,113 B2 * | 3/2005 | Sugata | 180/253 |
| 7,270,204 B2 * | 9/2007 | Taniguchi et al. | 180/65.51 |

* cited by examiner

*Primary Examiner*—J. Allen Shriver, II
*Assistant Examiner*—John D Walters
(74) *Attorney, Agent, or Firm*—Von Rohrscheidt Patents

(57) ABSTRACT

A transmission (1), preferably for a front axle of a floor transport vehicle (100), comprises at least one transmission stage, a drive sprocket (6), a hollow gear (4, 203), and a housing, wherein the drive sprocket (6) and the hollow gear (4, 203) each have a rotation axis, which axes are parallel and disposed offset from each other. A drive wheel (111) is connected in torque-proof fashion with the hollow gear and housing (4, 203) and the drive sprocket (6) is coupled to a drive motor (25). The motor is mounted to the transmission (1) through a flange. Assembly and disassembly of the transmission is simplified by the relatively few component parts of the transmission. Further, vehicle loads are efficiently transferred to the drive wheel by supporting the hollow gear (4, 203) rotatably upon a fixed support element (13) forming a section of the housing, wherein the support element (13) is disposed coaxial with the rotation axis of the hollow gear (4, 203).

17 Claims, 4 Drawing Sheets

TRANSMISSION

RELATED APPLICATIONS

This application claims priority from, and incorporates by reference, German patent application serial No. DE 10 2006 038 396.6, filed Aug. 15, 2006

BACKGROUND

1. Field of the Invention

The invention relates to a drive train transmission apparatus, preferably for a front axle of a floor transport vehicle with at least one transmission stage, comprising a housing, a drive sprocket, wherein the drive sprocket is coupled with a drive motor which is fixed to the transmission housing, a hollow gear, wherein the rotational axis of the drive sprocket and the hollow gear are disposed offset from each other, and a running wheel fixed in a torque-proof fashion with the hollow gear.

2. Introduction

Transmissions of the kind disclosed herein are typically required for drive wheels for floor transport vehicles. Such transmissions must preferably be built as small as possible, and additionally have to be suitable for carrying large loads. In order to assure the stability of the vehicle, the transmission apparatus must efficiently transfer drive torque to the running wheels and should not adversely influence the dimensions of the vehicle with respect to width and height. It is also of particular importance that the vehicle's center of gravity be located as low as possible, in order to reduce the risk of tipping. Furthermore, it has to be considered with transmissions of this kind that the loads the vehicle receives, which may be as large as five tons, can be transferred through the transmission housing to the running wheel.

U.S. Pat. No. 5,558,174 discloses a transmission assembly for floor transport vehicles, such as forklifts, which is provided for driving one of two front load-bearing drive wheels. For power generation, an electric motor is used, which drives a bevel gear mounted in a torque-proof fashion on a drive shaft. The bevel gear teeth mesh with a gear on a drive axle, mounted such that its axis is parallel with the rotational axis of the drive wheel and normal to the rotational axis of the electric motor and its drive shaft. The drive axle comprises a gear on its distal end which meshes with the interior ring gear of the hub of the drive wheel. The assembly disclosed in the '174 patent inefficiently transfers drive torque, in part because the rotational axis of the electric motor and its drive shaft is normal to the rotational axis of the drive wheel. Additionally, the physical size of the transmission makes the component cumbersome and, as substantial components are mounted relatively high from the floor, unnecessarily raises the center of gravity of the vehicle. Finally, the transfer of the loads to the running wheels is not performed in an optimum manner, in part because the assembly requires a drive shaft at least the length of the radius of the electric motor's armature stack.

3. Objects of the Invention

It is an object of the present invention to provide a transmission apparatus, which is compact, can be mounted in a fashion that keeps the vehicle's center of gravity low, uses relatively few components, and simultaneously allows a high load transfer through the housing onto the running wheels.

BRIEF SUMMARY OF THE INVENTION

According to the invention, there is provided a transmission in which the drive shaft of an electric motor comprises a drive sprocket. The drive sprocket meshes with a spur gear on a gear drive shaft whose rotational axis is parallel to, but offset from, the rotational axis of the motor drive shaft. A drive gear is affixed in torque-proof fashion to the gear drive shaft and meshes with a ring gear affixed in torque-proof fashion to the inside hollow portion of a bell-shaped housing. A drive wheel is mounted in conventional fashion to the external side of the bell-shaped housing.

An initial advantage of the invention is that the number of components used in the transmission is significantly reduced, since, for example, the drive wheel is directly connected in torque-proof fashion to the hollow gear and the hollow gear forms the main element of a transmission stage and the housing. Because the number of components is significantly reduced a substantially simplified assembly and disassembly of the transmission can be performed.

However, the main advantage of this invention is that the loads occurring on the vehicle are transferred directly from the frame of the vehicle into the transmission housing and from there directly through the hollow gear and its bell-shaped housing to the drive wheel, and the hollow gear and bell-shaped housing is further supported on a support element, which is a component of the housing. The transmission housing is directly connected to the frame of the vehicle through a lateral flange connection, so that the drive components are not impaired in their function through imposed loads, that is, they need only transfer torque.

In the preferred embodiment of the invention, the provided hollow gear element is formed within a bell-shaped housing which extends over and around its support element. The support element itself is a component of the housing or of a section of the housing and may comprise a central opening provided for receiving additional transmission components. The hollow gear and bell-shaped housing is supported upon the support element with bearing elements of conventional design. In such a manner, the hollow gear and bell-shaped housing assures a safe load reception and load transfer to the affixed drive wheel.

The transmission is preferably provided in two stages, wherein a first transmission stage is connected to the drive motor through a spur gear, while a second transmission stage is associated with the drive wheel through a drive gear in the nature of a planetary assembly which is only partially formed. Thereby, torque is transmitted according to the gear ratio, which can be adjusted for the application. This substantially increases the variability and thus also the utility of the transmission. According to requirements, a certain gear ratio can be selected by combining respective transmission stages with each other.

In an alternative embodiment, a pinion is provided in connection with the housing support element. The pinion is disposed co-axial to the rotation axis of the drive wheel, and can be housed within a central opening of the support element of the housing. Pinion positioning connection can be performed through pressing it in, or through bolting it on. It is also possible that the pinion may be integrally formed with the housing, or the housing component. Conventional bearing elements are then mounted circumferentially to the shaft of the pinion and support the hollow gear and bell-shaped housing. One and preferably several roller bearings are provided adjacent the pinion in order to support the hollow gear and bell-shaped housing. By supporting the hollow gear and bell-shaped housing in this fashion, transfer of the vehicle load to the drive wheel is accomplished and transferred loads to the other transmission components is avoided.

The bearing elements are fixed in position by lock washers or retaining rings proximal to the support element. Distal to the support element, the bearing elements abut a support shoulder of the hollow gear and bell-shaped housing and are retained by lock washers or retaining rings adjacent the pinion.

In the preferred embodiment, the transmission housing comprises two transmission stages. The first transmission stage is provided by a spur gear, which is supported on a gear drive shaft, or integrally provided with it. The spur gear meshes with a drive sprocket, which is coupled to the drive motor, preferably an electric motor, through another drive shaft, so that a direct force transfer can be performed. The gear drive shaft of the transmission further comprises a drive gear which is received in the hollowed cutout of the bell shaped housing component thereby forming a second transmission stage. The drive gear is fixed to the drive shaft and rotates with it. The drive gear meshes with an inner gearing of the hollow gear and bell-shaped housing, so that torque transmission is performed directly from the drive sprocket of the motor through the spur gear and the drive shaft, to the drive gear, and from there to the hollow gear.

For the teeth of the hollow gear, helical gear teeth are advantageously selected, allowing noise reduction. For a further reduction of the number of components, the drive shaft and the drive gear, the drive shaft and the spur gear, or the drive shaft, the spur gear and the drive gear can be provided integrally.

In a floor transport vehicle with two front drive wheels, a transmission according to the invention is provided for each drive wheel each with an independent drive motor connected therewith. Through the independent drive motors, differential compensation of the two drive wheels of the front drive axle is accomplished.

The disclosed transmission presents the major advantage of using relatively few components and is, thereby, rugged and reliable. Direct transmission of the loads received by the vehicle to the drive wheels through the transmission housing is also possible since the drive wheels are supported through the hollow gear and bell-shaped housing which, in turn, is supported through bearings on a support element fixed to the frame of the vehicle. Required torque is efficiently transferred to the internal gearing of the hollow gear, which meshes with a planetary gear, which is fixed to the gear drive shaft of the transmission. The drive shaft has a spur gear, which meshes directly with the drive sprocket of a drive motor connected to the transmission through a flange. In this fashion, torque transfer to the drive wheel is possible without large friction losses. Finally, a compact unit is provided, which can be connected to a frame of a floor transport vehicle through a flange. In as far as a differential compensation is required for the drive wheels this is performed through a respective control of the electric drive motors without the gears requiring a differential stage.

BRIEF DESCRIPTION OF THE DRAWINGS

The invention is subsequently described again with reference to the drawing figures. It is shown in.

TABLE OF REFERENCE NUMERALS

| Reference No. | Description |
|---|---|
| 1 | transmission |
| 2 | housing component |
| 3 | housing component with support element |
| 4 | hollow gear and bell-shaped housing |
| 5 | drive shaft |
| 6 | drive sprocket |
| 7 | gear teeth |
| 8 | gear teeth |
| 9 | spur gear |
| 10 | gear drive shaft |
| 11 | bearing element |
| 12 | bearing element |
| 13 | support element |
| 14 | bearing element |
| 15 | seal element |
| 16 | drive gear |
| 17 | gear teeth |
| 18 | inner gear teeth |
| 19 | mounting bolt |
| 20 | mounting bolt |
| 21 | stud |
| 22 | lateral face |
| 23 | housing cover |
| 24 | cutout |
| 25 | drive motor |
| 26 | retaining ring |
| 27 | retaining ring |
| 28 | helical gear teeth |
| 29 | helical gear teeth |
| 30 | spherical faced nut |
| 31 | cutout |
| 32 | plug |
| 33 | retaining ring |
| 100 | floor transport vehicle |
| 101 | front axle |
| 102 | steering apparatus |
| 103 | superstructure |
| 104 | driver seat |
| 105 | steering wheel |
| 106 | superstructure |
| 107 | fork |
| 108 | carrier |
| 109 | frame |
| 110 | drive motor |
| 111 | drive wheel |
| 112 | running wheels |
| 200 | shaft pinion |
| 201 | pass through |
| 202 | housing section |
| 203 | bearing element |
| 204 | hollow gear and bell-shaped housing |
| 205 | retaining ring |
| 206 | retaining ring |
| 207 | shoulder |
| 208 | plug |
| 209 | cutout |

DETAILED DESCRIPTION OF THE INVENTION

Figure 1:
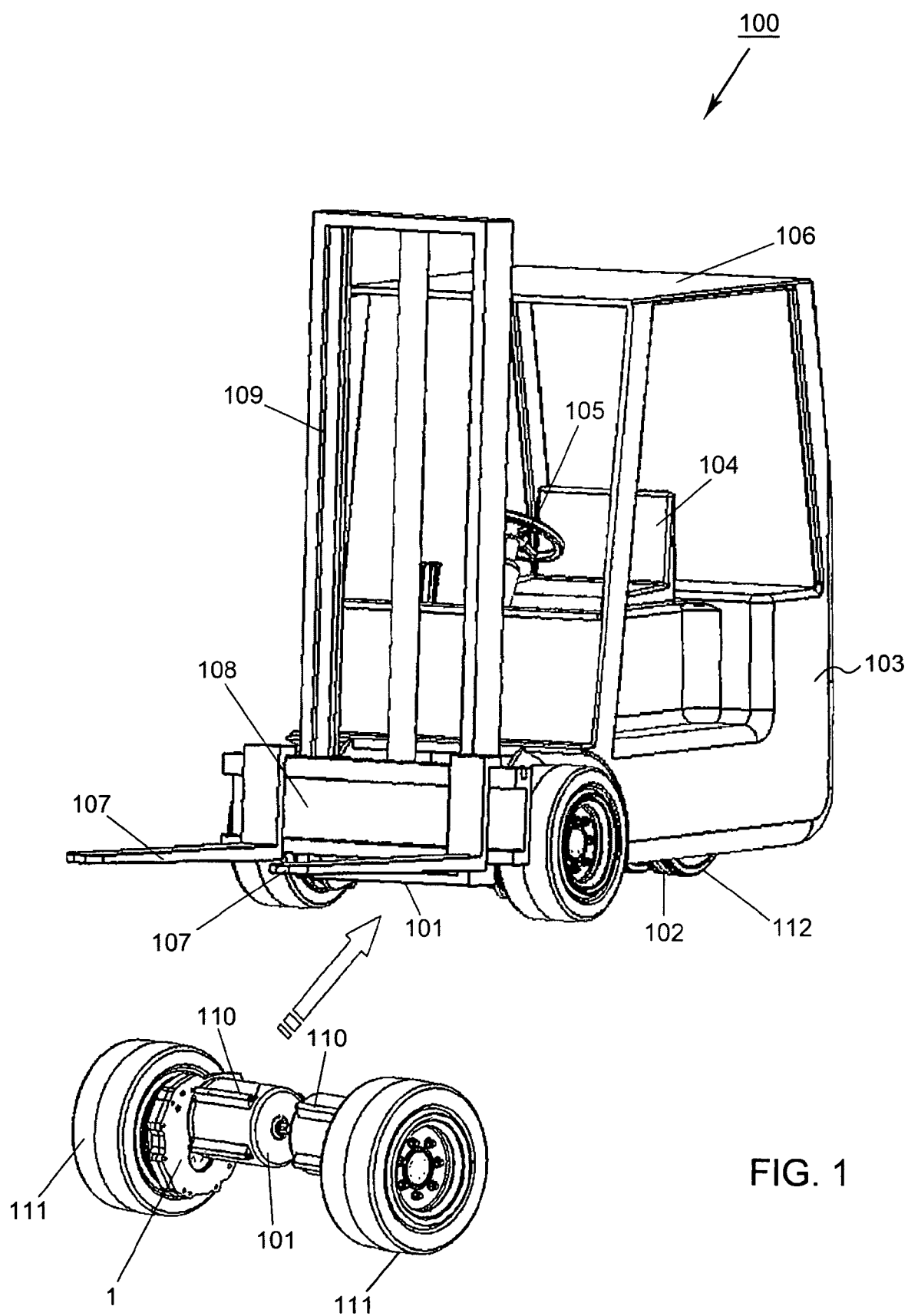
FIG. 1 a floor transport vehicle, which is equipped with a transmission according to the invention, in a perspective view.

FIG. 1 shows a floor transport vehicle 100 in a perspective view with a front axle 101 and a rear wheel steering apparatus 102, of which only the attached running wheels 112 are shown. The floor transport vehicle 100 has a box shaped superstructure 103, with a driver seat 104, and a steering wheel 105. A superstructure 106 is provided above the box shaped superstructure 103 for driver protection, the superstructure 106 being open on all sides but closed in the upper section. Two forks 107 are used for lifting loads, wherein the distance between each can be adjusted on a carrier 108. The carrier 108 can be adjusted in elevation along a frame 109, whereby lifting loads is possible. For driving the floor transport vehicle 100, two electric drive motors 110 each with a transmission 1, and associated drive wheel 111, are provided. The steering of the floor transport vehicle is performed through the steering wheel 105, which is in direct operating engagement with a steerable rear axle, which is comprised of a steering apparatus 102 with double tire running wheels 112 attached thereon.

Figure 2:
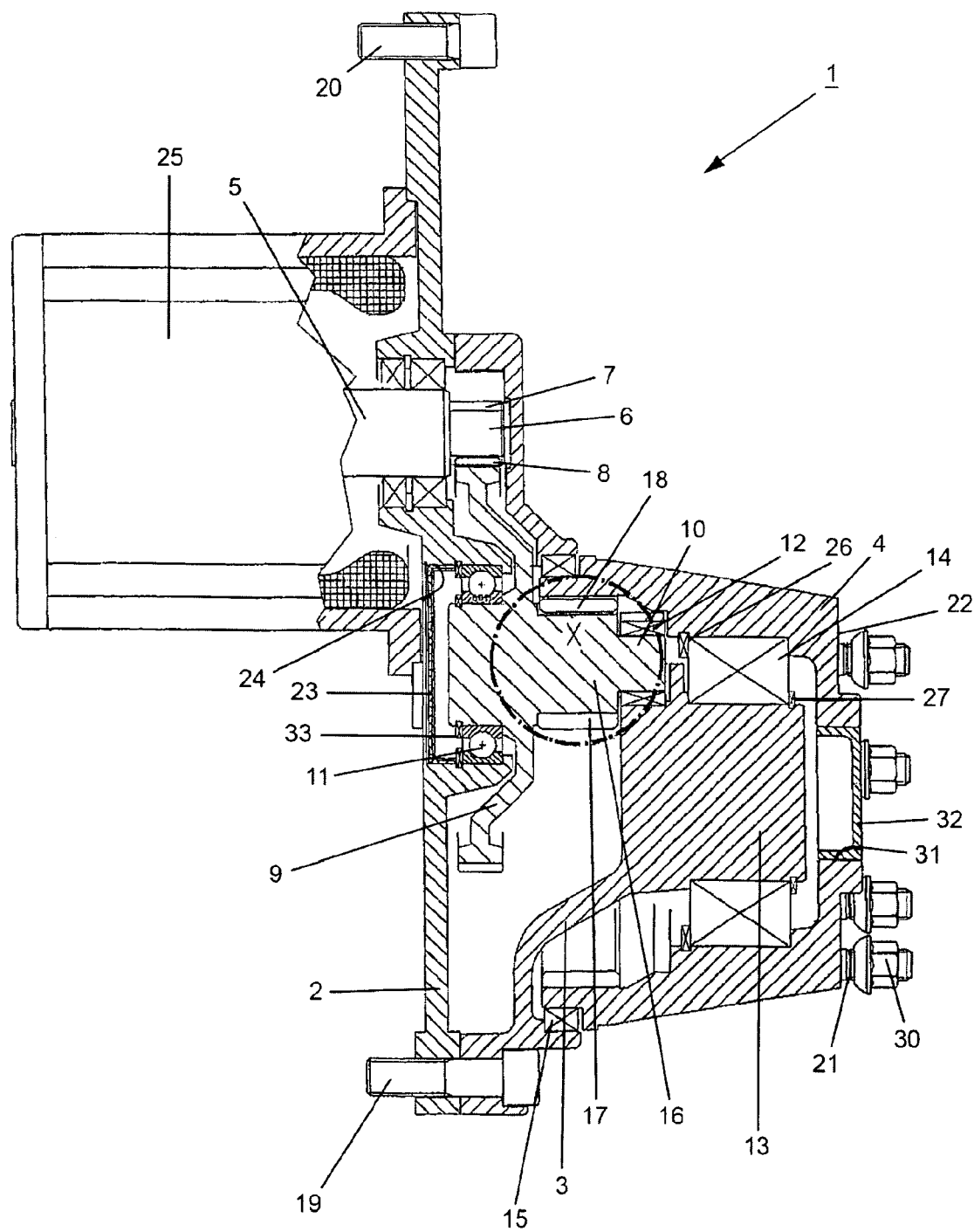
FIG. 2 an embodiment of a transmission according to the invention in a sectional side view.

FIG. 2 shows an embodiment of a transmission 1 according to the invention in a sectional side view, which has a two-part housing 2, 3. The first part 2 comprising an inner housing fastened to the frame of the vehicle by mounting bolts 19, 20 and the second comprising a housing component with support element 3. A hollow gear and bell-shaped housing 4 is rotatably supported by the housing component with support element 3. The first housing section 2 is connected directly to the vehicle frame (not shown) of a floor transport vehicle and the second section or housing component with support element 3 is connected to the first section so that forces occurring by the loading of the floor transport vehicle are transferred through the housing directly onto a drive wheel, which is also not shown. Rotation of the drive wheel is performed through a drive motor 25 with a drive shaft 5 and drive sprocket 6. The drive sprocket's 6 gear teeth 7 mesh with the gear teeth 8 of a spur gear 9, which is supported on a gear drive shaft 10. In the shown embodiment, the spur gear 9 and the gear drive shaft 10 are provided integrally. Further, the gear drive shaft 10 is supported through bearing elements 11 proximate to the housing section 2 and through additional bearing elements 12 proximate to the housing component with support element 3. The bearing elements 11 are fixed in position in the housing component 2 through retaining rings 33.

Those skilled in the art will recognize that the spur gear 9 and the gear drive shaft 10 may be independent components, wherein the spur gear 9 is supported in a torque-proof manner on the gear drive shaft 10.

The housing component with support element 3 is partially provided bell shaped, and provides a substantial support element 13, which is provided for supporting the hollow gear and bell-shaped housing 4. Conventional bearing elements 14 are used and disposed between the support element 13 and the hollow gear and bell-shaped housing 4. Bearing elements 14 may be ball bearings or roller bearings and preferably a double or a multiple arrangement of these is provided. The housing component with support element 3 and the first transmission stage, formed by the sprocket gear 6 and the spur gear 9, are enclosed by the hollow gear and bell-shaped component 4. Thus, from a lateral view only the rotating hollow gear and bell-shaped housing 4 is visible and forms a part of the housing proximate the support element 13.

Between the hollow gear and bell-shaped housing 4 and the housing component with support element 3, a seal element 15 is provided, in order to prevent lubricant from passing through.

In the preferred embodiment, the gear drive shaft 10 is provided integrally with a drive gear 16, having gearing 17. Alternatively, the gear drive shaft 10 and the drive gear 16 can be provided as two components, wherein the drive gear 16 is mounted in a torque-proof fashion onto the gear drive shaft 10. The drive gear's 16 gear teeth 17 mesh with the gear teeth 18 on the inner portion of the hollow gear and bell-shaped housing 4. Preferably, for noise optimization, helical gear teeth 28, 29 (see FIG. 3) are used. The hollow gear and bell-shaped housing 4 is secured by the bearing element 14 and the retaining rings 26 and 27.

Through mounting bolts 19, the two transmission housing components 2, 3 are connected both to each other and to the vehicle frame. Additional mounting bolts 20 are also used to mount the first housing component 2 onto the vehicle frame. A cutout 24 of the first transmission housing component 2 provides a recess for receiving the bearing elements 11 and the gear drive shaft 10. Cover for the transmission stage is provided by a housing cover 23 over the cutout 24.

The drive wheel (not shown) is directly bolted to the hollow gear and bell-shaped housing 4 through threaded studs 21 and nuts 30 with spherical contact faces, wherein the studs 21 are disposed in the lateral face 22 of the hollow gear and bell-shaped housing 4. The hollow gear and bell-shaped housing 4 further comprises a cutout 31, into which a plug 32 is inserted. This feature advantageously simplifies assembly and disassembly of the transmission 1, particularly if a shaft pinion 200 (see FIG. 4) is used as support element 13.

Advantageously, the assembly of the transmission 1 is performed, so that the housing section with support element 3 is fitted with the drive gear 16, the spur gear 9, the gear drive shaft 10, and the bearing elements 11, 12. Next, the housing section 2 is mounted to the housing section with support element 3, with seal element 15 placed. Then the hollow gear and bell-shaped housing 4 is mounted. The motor 25 with the drive sprocket 6 can thereafter be connected to the housing part 2.

Figure 3:
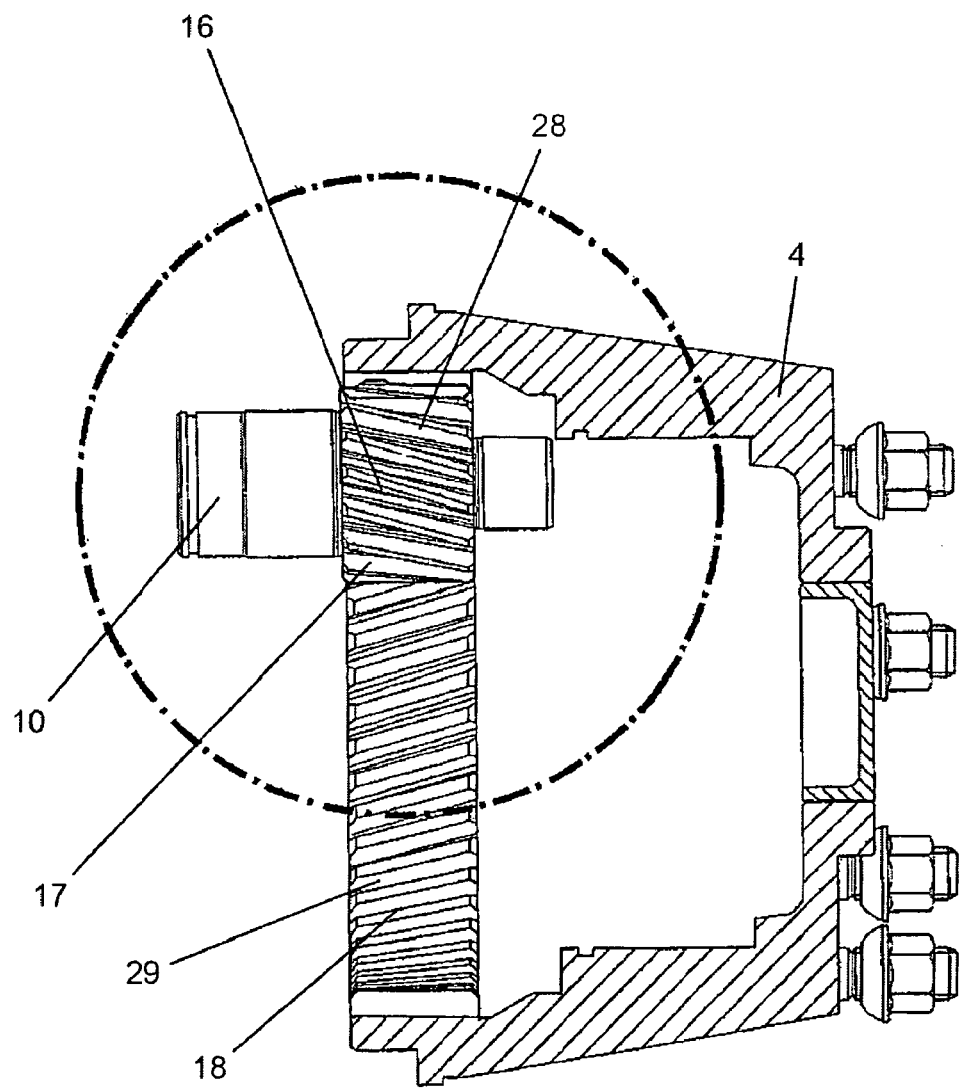
FIG. 3 the detail X according to FIG. 2 in an expanded sectional view.

FIG. 3 shows the hollow gear and bell-shaped housing 4 in a partial sectional view, the gear drive shaft 10 and the drive gear 16, whose gear teeth 17 mesh with the inner gear teeth 18 of the hollow gear 4. In this detail drawing the drive gear 16 is provided with helical gear teeth 28 and the inner gear teeth 18 of the hollow gear 4 are also provided as helical gear teeth 29. This helical design of the gear teeth 17 and 18 facilitates noise optimization of the transmission 1 compared to straight gear teeth.

Figure 4:
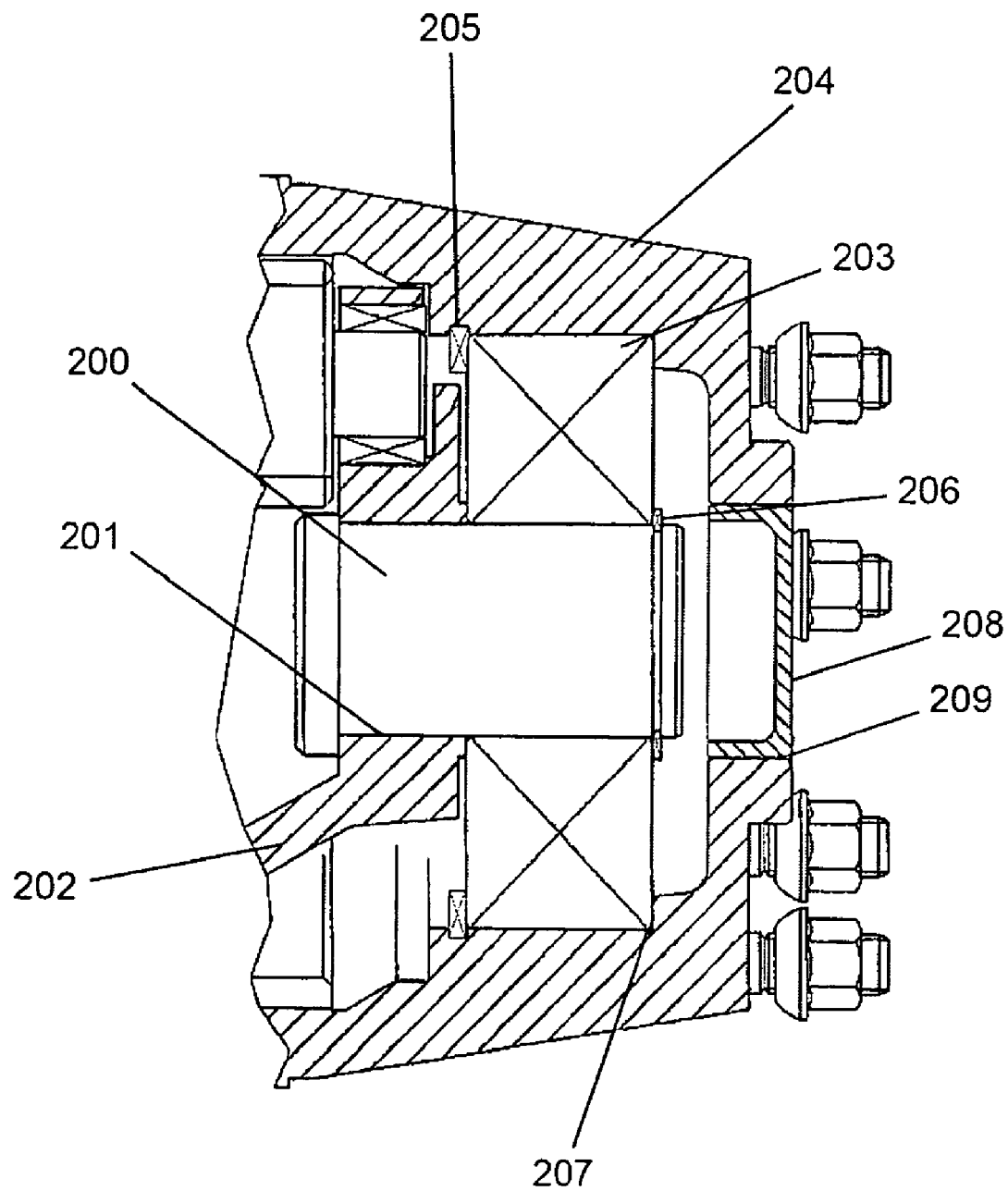
FIG. 4 an alternative embodiment for a support element in a partial sectional view.

FIG. 4 shows an additional embodiment of a support element 13 in a partial sectional view. In this embodiment, the support element 13 is provided as a shaft pinion 200, and is located in a cutout 201 of the housing part 202. The shaft pinion 200 is supported relative to the hollow gear and bell-shaped housing 204 through support elements 203. The support elements 203 are secured in the hollow gear and bell-shaped housing 204 through retaining rings 205, wherein the bearing elements 203 abut shoulders 207 within the hollow gear and bell-shaped housing 204. The shaft pinion 200 in turn is secured by a retaining ring 206 in the opening 201, wherein the retaining ring 206 is laterally disposed at the bearing element 203. The remainder of the assembly largely corresponds to the embodiment known from FIG. 2.

Furthermore, as is visible in FIG. 4 the shaft pinion 200 is accessible, when the plug 208 is removed from the cutout 209 of the hollow gear and bell-shaped housing 204, which greatly simplifies the assembly and disassembly of the transmission 1.

The transmission 1 according to the invention is thus made from a small number of components, which can be assembled very easily and which can also be maintained very easily. The transmission 1 transfers torque from a motor to drive a non-steerable drive wheel 111 of a floor transport vehicle 100, wherein the drive wheels 111 are disposed in pairs and can each be driven independently from each other.

The embodiments described with reference to the figures are illustrative and not restrictive.

What is claimed is:

1. A transmission, preferably for a front axle of a forklift truck, comprising at least one gear speed, a drive pinion, an internal gear, and a housing, wherein the drive pinion and the internal gear each comprise a rotation axis arranged offset with respect to each other, a running wheel is configured to be directly connected to the internal gear for co-rotation, and the drive pinion is configured to be coupled to a drive motor that is configured to be flanged to the transmission, wherein the internal gear is rotatably mounted on a stationary support element, and after it has been assembled to the support element, forms a portion of the housing, wherein the support element is arranged coaxially with the rotation axis of the internal gear, wherein the internal gear meshes through an internal teething with a planetary gear which is configured as a drive shaft and configured with a centrically configured teething, and which is supported on both sides of the teething through a bearing element.

2. A transmission according to claim 1, wherein the support element is a housing journal or a shaft journal or is provided by a housing portion configured as a hollow walled housing bell.

3. A transmission according to claim 2, wherein the shaft journal is supported for co-rotation, received in an opening and fixated by a locking ring.

4. A transmission according to claim 2, wherein the housing journal is connected to the housing by being pressed in or threaded to it, or is integrally configured with the same.

5. A transmission according to claim 2, wherein the housing journal or the shaft journal is configured for receiving at least one bearing element.

6. A transmission according to claim 5, wherein the internal gear is supported at the bearing element.

7. A transmission according to claim 1, wherein the internal gear is configured as a bell and covers the support element so as to grip over it.

8. A transmission according to claim 1, wherein the internal gear comprises an internal teething.

9. A transmission according to claim 8, wherein the internal teething is configured as a helical gearing.

10. A transmission according to claim 1, wherein the drive shaft is provided for receiving a cylindrical gear and a planetary gear.

11. A transmission according to claim 10, wherein the drive shaft and the planetary gear are configured in one piece, wherein the cylindrical gear is fixated on the drive shaft, or the drive shaft and the cylindrical gear are configured in one piece, wherein the planetary gear is fixated on the drive shaft, or the drive shaft, the cylindrical gear and the planetary gear are configured in one piece.

12. A transmission according to claim 1, wherein the drive pinion directly meshes with a cylindrical gear that is connected to the drive shaft for co-rotation and on which the stationary supported planetary gear is disposed.

13. A transmission according to claim 1, wherein the transmission is a two speed transmission, and a first gear speed with a cylindrical gear is associated with the drive motor, while a second gear speed is associated with the running wheel in the form of an only partially implemented planetary configuration.

14. A transmission according to claim 1, wherein one respective transmission is provided for each running wheel and configured to be driven by a drive motor, wherein at least two uncoupled running wheels form a front axle configured as a drive axle.

15. A transmission according to claim 14, wherein the drive motors of the two running wheels of the front axle are configured, so that differential compensation can be achieved through the same.

16. A drive device, in particular for a front axle of a forklift truck, comprising a drive motor and a running wheel, a transmission according to claim 1, wherein the drive motor is flanged to the transmission and the running wheel is directly connected to a housing portion configured as internal gear for co-rotation.

17. A transmission according to claim 1, wherein a center of an axial extension of one bearing element of the planetary gear coincides substantially with a center of an axial extension of a teething of the drive pinion.

* * * * *